Figure 1:
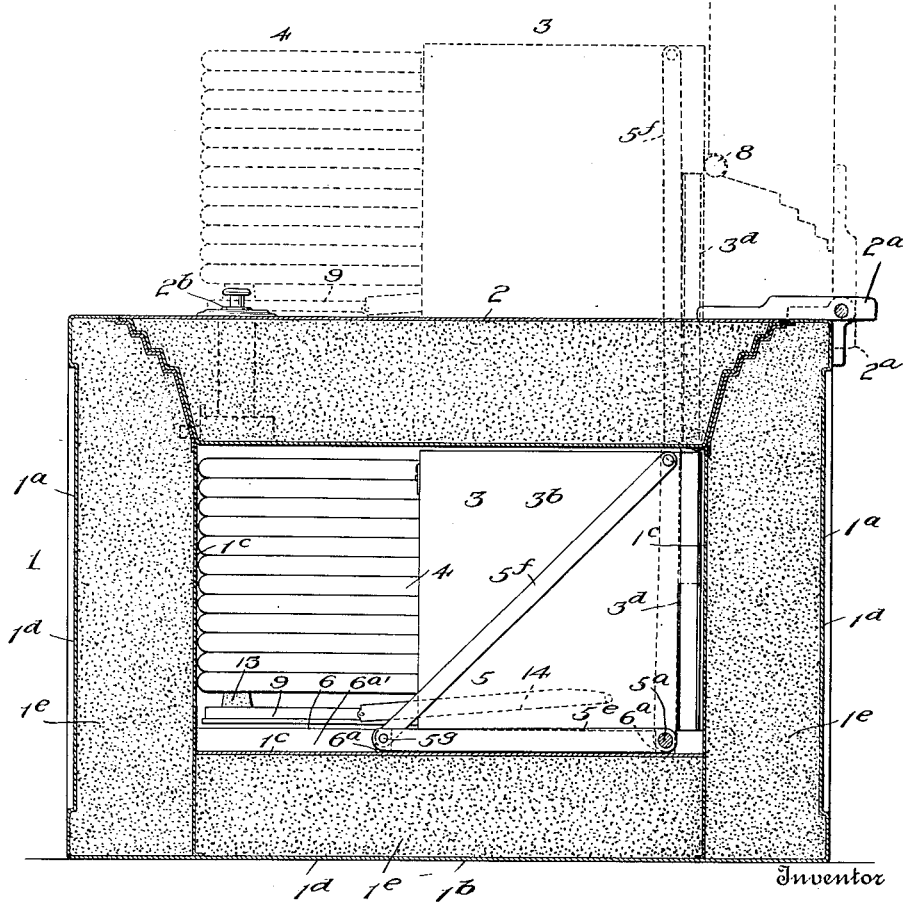

G. JACOBS
FILING APPLIANCE.
APPLICATION FILED FEB. 21, 1911. RENEWED JAN. 25, 1916.

1,195,991.

Patented Aug. 29, 1916.
5 SHEETS—SHEET 1.

Witnesses
Edwin L. Bradford
Geo. B. Pitts

Inventor
George Jacobs,
By Edward R. Alexander
Attorney

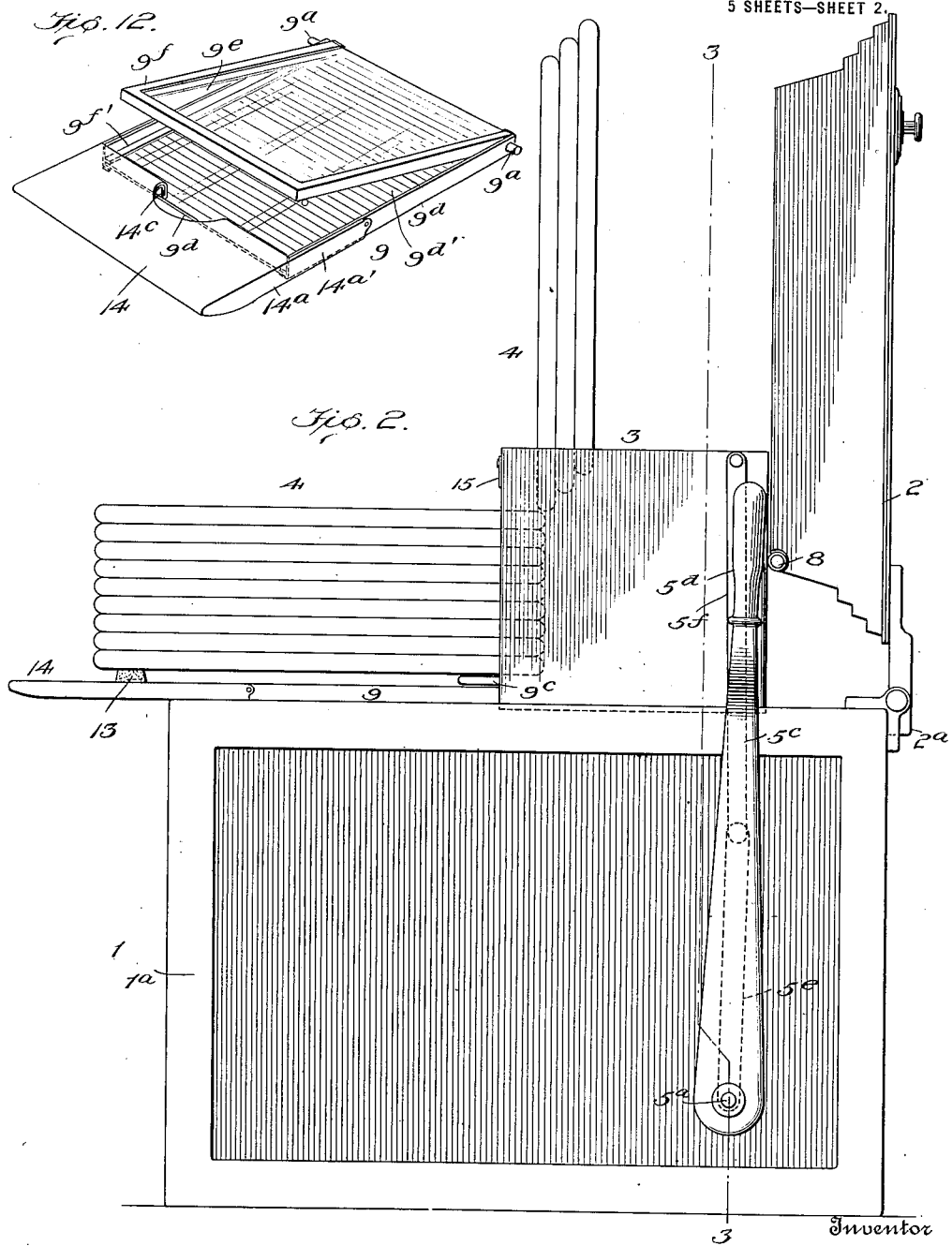

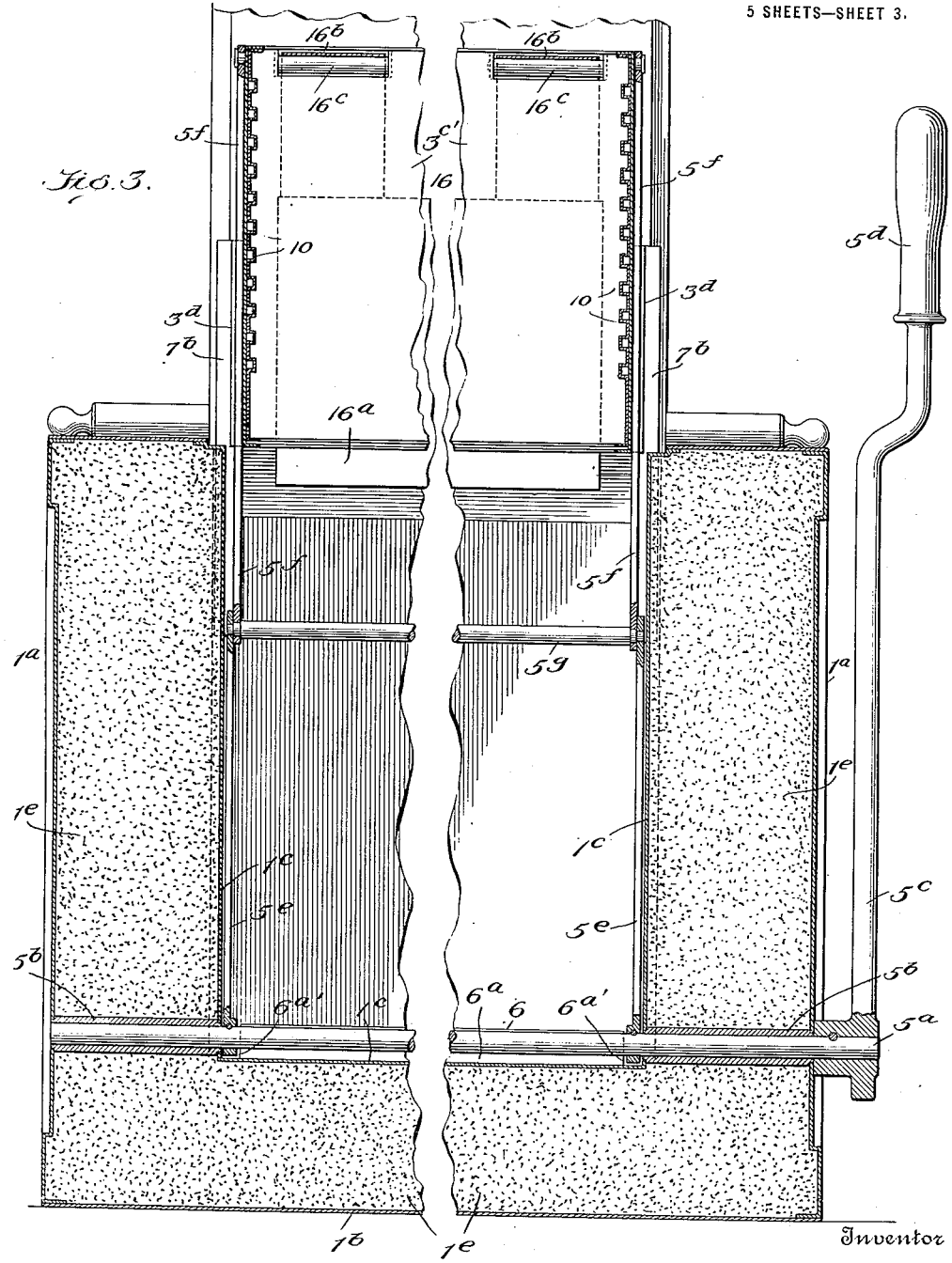

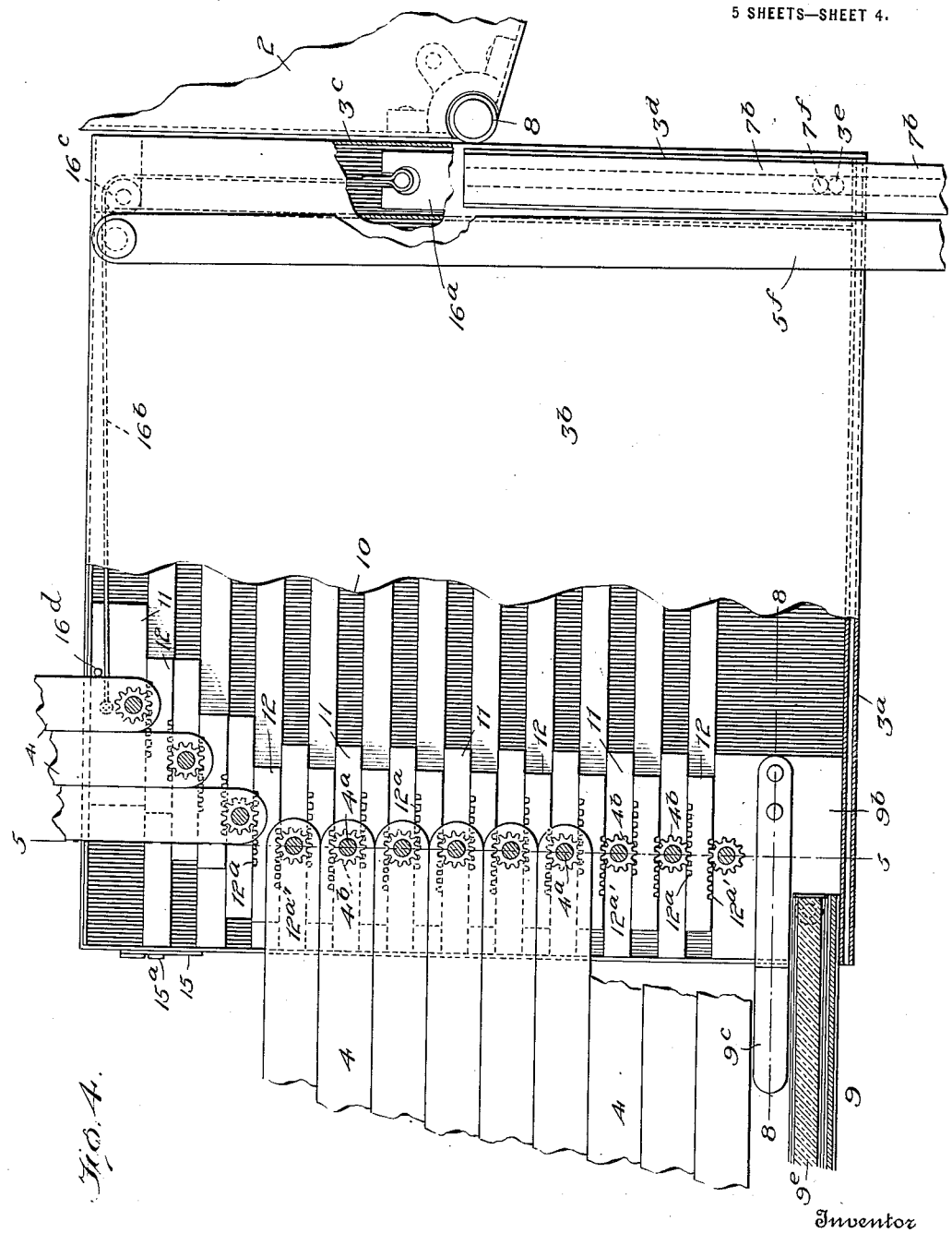

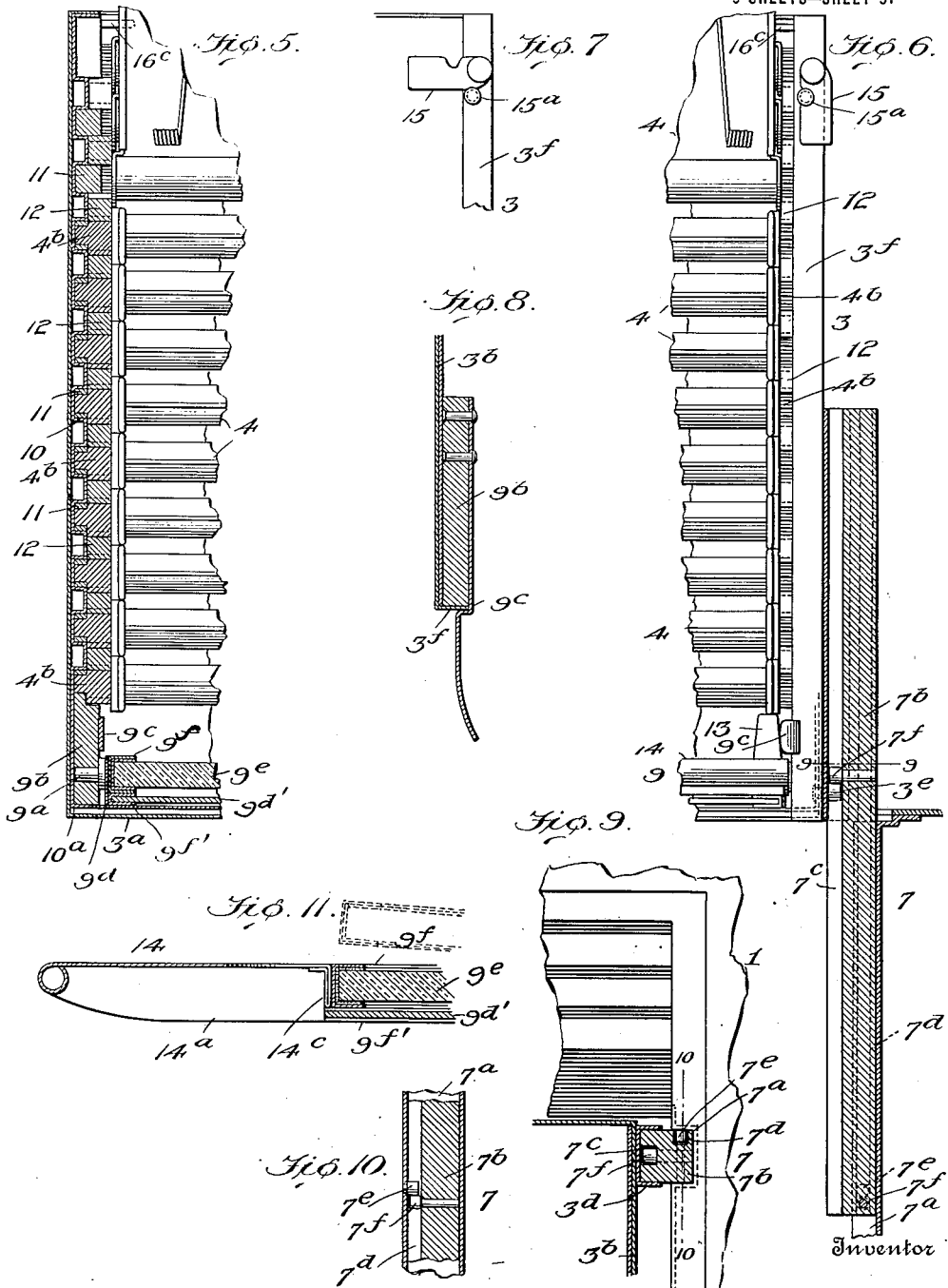

UNITED STATES PATENT OFFICE.

GEORGE JACOBS, OF CLEVELAND, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,195,991.      Specification of Letters Patent.      Patented Aug. 29, 1916.

Application filed February 21, 1911, Serial No. 609,973. Renewed January 25, 1916. Serial No. 74,276.

*To all whom it may concern:*

Be it known that I, GEORGE JACOBS, citizen of the United States, residing at Cleveland, in the county of Cuyahoga and State of Ohio, have invented certain new and useful Improvements in and Relating to Filing Appliances, of which the following is a specification.

This invention relates to a filing appliance adapted for the filing of papers, sales slips, bills, memoranda and the like in classified order.

For the purpose of illustration, I have in the accompanying drawings, shown and herein described one form of filing appliance embodying my invention.

In the drawings Figure 1 illustrates a filing appliance embodying my invention partly in vertical section. Fig. 2 is a side elevation thereof showing the elevator in raised position and certain of the leaves or frames reclined. Fig. 3 is a transverse sectional view on the line 3—3 of Fig. 2. Fig. 4 is a fragmentary longitudinal vertical section, parts being broken away. Fig. 5 is a section on the line 5—5 of Fig. 4. Fig. 6 is a fragmentary front view of the elevator, the leaves or frames, and the guide mechanism therefor, the latter being shown in section. Fig. 7 is a detail view of the base locking devices. Fig. 8 is a section on the line 8—8 of Fig. 4. Fig. 9 is a horizontal section on the line 9—9 of Fig. 6. Fig. 10 is a vertical section on the line 10—10 of Fig. 9. Fig. 11 is a vertical section through a portion of the base for the leaves and the writing board. Fig. 12 is a perspective view of the base and hand rest, detached.

In the drawings, 1 indicates a casing or housing which may form part of and be made integrally with a safe or vault adapted for holding various records and articles in addition to the slip or bill holding leaves hereinafter described. The form of casing illustrated preferably comprises sides $1^a$, and a bottom $1^b$, it being open at the top.

2 indicates a door or cover, hinged along one edge, for closing the top of the casing or housing.

The casing 1 is preferably formed of fireproof material. One form of such construction may consist of sheet metal plates $1^c$, $1^d$, separated from each other and constructed and secured together to form the outer and inner walls of the casing, the spaces between the plates being filled with suitable fire and heat resisting material $1^e$, such as shown in Fig. 1. The door 2 may be similarly constructed. This latter form of construction for the casing and door materially reduces their cost, simplifies and facilitates their building, and produces a casing relatively light, whereby it can be moved from place to place conveniently.

$2^a$ indicates a stop, preferably comprising an arm projecting laterally from the rear or hinged edge of the door 2. This arm being rigidly connected to the door, is moved thereby into engagement with the casing when the door is opened and limits its movement rearwardly. It is preferably arranged to stop the door at the vertical position. (See Fig. 2.)

The door 2 is preferably provided with a combination lock $2^b$ as is customary in fireproof and burglar proof casings or safes.

3 indicates an elevator or frame movable vertically in the casing.

4 indicates a series of pivotally mounted leaves or paper carrying frames supported by or in the elevator 3.

The elevator or frame 3 is preferably formed of sheet metal and comprises a bottom $3^a$, side walls $3^b$ and a rear wall $3^c$; it being open at the front and top to permit the operation of the leaves from a horizontal to a vertical position, and vice versa.

6 indicates a platform, preferably formed of sheet metal, arranged on the bottom $1^b$. It is formed with two transverse slots or grooves $6^a$, and is also of a width to form with the adjacent side walls $1^a$ a longitudinal groove $6^{a\prime}$ at either side to receive certain parts of the raising and lowering mechanism, as will be later described. This platform serves as a rest for the elevator 3 and leaves 4 and supports them above the parts of the elevating mechanism just referred to.

Of the raising and lowering mechanism 5, $5^a$ indicates a rock shaft extending transversely through the rearmost recess or groove $6^a$, suitable journals $5^b$, $5^b$, being provided in the opposite side walls $1^a$ therefor. One end of the shaft $5^a$ extends through the side of the casing and has secured to it an operating device, such as a lever $5^c$, having a handle $5^d$, whereby the shaft $5^a$ may be manually rocked.

$5^e$ indicate rods each fixed or keyed at one end to the shaft $5^a$. They are spaced on the shaft $5^a$ so that each will lie in the adjacent longitudinal groove $6^{a'}$ formed along each side of the platform 6.

$5^f$ indicate links, each pivoted at its lower end to the free end of the adjacent rod $5^e$ and also pivoted at its upper end to the elevator 3 preferably at a point in the same vertical plane above the rock shaft $5^a$.

$5^g$ indicates a connecting bar between the links and rods at one side and the links and rods on the other side. The opposite ends of this bar preferably form the pivot pins for the links and rods. It operates to keep the links and rods in alinement with each other so as to avoid buckling or binding thereof, and is received in the foremost recess or groove $6^a$, when the elevator is lowered to rest upon the platform 6, as shown in Fig. 1.

The raising of the elevator 3 is effected by rocking the shaft $5^a$, which in turn swings the rods $5^e$ from a horizontal to a vertical position. The rods $5^e$, operating through the links $5^f$ move the elevator upwardly, these rods and links being of a length to raise the elevator sufficiently high to bring the bottom $3^a$ in substantially the same horizontal plane with the top or upper edge of the casing 1. In operating the shaft $5^a$, it is preferably rocked a distance to bring the links into engagement with an abutment, such as the adjacent walls of the channel plates $3^d$, with the axes of the pivots, which connect the links and rods together, slightly rearward of a line passing through the axis of the shaft $5^a$ and the axes of the pivots which connect the upper ends of the links $5^f$ to the elevator 3. The abutment operating to prevent the folding of the links relative to the rods, will maintain the elevator in raised position.

The door 2 is preferably opened and closed by the raising and lowering of the elevator 3 through the manipulation of the lever $5^c$. 8 indicates a roller suitably mounted at the lower inner edge or corner formed by the bottom and rear side face of the door 2, and projecting slightly beyond said bottom and said side face. When the door 2 is closed, the roller 8 is arranged in the path of movement of the upper rear edge of the elevator 3, so that as the elevator 3 moves upwardly its upper edge engages with the roller 8 and swings the door on its axis into a vertical position. In this operation, the roller 8 permits the edge of the elevator to swing around the adjacent corner or edge of the door 2 until the latter is moved to a position out of the path of the elevator. During the continued upward movement of the elevator 3, the roller 8 may act as an antifriction device between the rear wall of the elevator and the bottom of the door. The door is pivoted on an axis rearward of its center of gravity and therefore tends to swing into the closed position. It is held in the vertical or open position by the elevator 3. The tendency of the door to close causes it to follow the elevator 3 in the lowering operation thereof in a manner opposite to its movement in the raising operation.

Guide mechanism 7 for the elevator may be provided between its walls $3^b$ and the adjacent walls $1^a$ of the casing 1. Since the mechanism on one side of the elevator is similar to that on the other side, it will only be necessary to describe the mechanism at one side. Of this mechanism, $7^a$ indicates a channel formed in the inner face of the side wall $1^a$. $7^b$ indicates a bar or member slidable in the channel $7^a$. $3^d$ indicates a channel plate carried by the elevator 3 and slidably engaging the bar or member $7^b$. The bar $7^b$ is formed with longitudinally extending grooves or recesses $7^c$, $7^d$, the groove $7^c$ being formed in that face adjacent to the elevator $3^b$ and the groove $7^d$ being formed in one of the other faces of the bar.

$3^e$ indicates a projection carried by the elevator 3 and extending into the groove $7^c$. $7^e$ indicates a projection extending into the groove $7^d$ from the adjacent face or wall of the channel $7^a$. $7^f$, $7^f$, indicate stop pins carried by the bar $7^b$. One of the stops is arranged within and at or near the lower end of the groove $7^d$, and the other of the stops is arranged within the groove $7^c$ at a point preferably midway between the opposite ends of the bar $7^b$.

From a comparison of Figs. 2 and 3 or 6, it will be seen that the elevator 3, bar $7^b$ and side wall $1^a$ of the casing have a telescoping movement relative to each other when the elevator is raised and lowered. The operation of these parts may be described as follows: When the elevator 3 is raised by the raising mechanism 5, the pin or projection $3^e$ slides upward in the groove $7^c$ until it engages the stop $7^f$; then the continued upward movement of the elevator pulls or slides the bar $7^b$ upward in the channel $7^a$ until the stop $7^f$ carried thereby in the groove $7^d$ engages the pin $7^e$. The pin $7^e$ prevents further upward movement of the bar $7^b$. In the lowering movement of the elevator 3, the bar $7^b$ and elevator move downwardly together until the bar $7^b$ reaches the bottom of the channel $7^a$; the elevator continues moving downwardly until it rests upon the platform 6.

As shown in Figs. 3 and 6, when the elevator 3 and bars $7^b$ are in elevated position, the latter extend downwardly into the channel $7^a$ for a portion of their length, and also upwardly in the channel plates along the opposite sides of the elevator 3 for the other portion of their length; also, the pins $7^e$ engaging the walls of the grooves $7^d$ maintain the lower ends of the bars in the channel $7^a$. This construction operates to support the from the elevator frame and the rear leaf is held in vertical position by the weight 16ª, the gearing or connections between the leaves will cause the leaves to move rearwardly as they are moved into the horizontal position and such operation will result in positioning them in compact, superposed relationship in the elevator (see dotted lines in Fig. 1) ready for lowering.

13 indicates a cushion arranged near the forward end of the base 9. This cushion supports the leaves at the front ends as shown in Fig. 2.

The base 9 preferably comprises two members 9ᵈ, 9ᵉ, pivotally connected by the studs 9ᵃ to each other and to the blocks 9ᵇ. This form of construction permits the upper member 9ᵉ, which may comprise a glass plate, to be swung upwardly independently of the other member. Metal plates or strips 9ᶠ bent over and extending along the front and opposite side edges of the glass plate 9ᵉ may be provided for protecting said plate 9ᵉ.

The frame 9ᵈ preferably constitutes an index carrying frame. It comprises an index carrying plate 9ᵈ′ slidingly mounted in guides 9ᵈ″ arranged along its opposite sides.

14 indicates a hand rest or writing board. It is arranged forward of the leaves, and is preferably formed of sheet metal and bent downward along its opposite sides to form flanges 14ª.

14ª′ indicate arms extending rearwardly from the flanges. These arms are pivotally connected at their free ends to the sides of the base 9, whereby the hand rest or writing board may be folded into the position shown in Fig. 1. The portion of the metal between the arms 14ª′ is doubled on itself to form a transverse support 14ᶜ which rests upon a forward projecting ridge of the base member 9ᵈ and thus supports the writing board in a plane co-incident with the base member 9ᵉ.

15 indicates a lock, preferably comprising a plate pivoted to one of the flanges 3ᶠ of the elevator 3. The purpose of this lock is to hold the leaves in vertical position, or to maintain the glass plate 9ᵉ in vertical position to permit changes in or additions to the index at any time. It may also lock both members of the base in vertical position if that is desirable in order to close the index from the vision of persons not entitled to inspect it. 15ª indicates a stop or pin which supports the plate in operative position, as shown in Fig. 7. The stop also maintains it in pendant position when not in use, and prevents it from moving into engagement with any of the leaves, as shown in Fig. 6.

To those skilled in the art of making filing appliances of the class described, many alterations in construction and widely differing embodiments and applications of my invention will suggest themselves, without departing from the spirit and scope thereof. My disclosures and the description herein are purely illustrative, and are not intended to be in any sense limiting.

I have combined with a fire-proof and burglar proof structure or casing a series of leaves, an elevator for supporting the leaves, whereby they can be moved into the casing for storage purposes and moved out of the casing for operation, and mechanism for raising and lowering the elevator at will. Furthermore, the raising and lowering mechanism is constructed to be operated from one side of the casing in convenient position for manipulation and without the necessity of first opening the door; also, means are provided for engagement between the elevator and the door whereby the latter is opened by the elevator in its movement upward, and the door is hinged so as to close itself when the elevator is lowered.

Among the other objects of my invention I have provided improved means for supporting the leaves and for causing relative movement between the pivots of one leaf and the pivots for adjoining leaves. These improved means permit the leaves to arrange themselves in stepped relationship when moved in one position and in superposed or compact relationship when operated into the other position, and ready to be telescoped into the elevator for lowering into the casing.

What I claim is:—

1. In a filing appliance, the combination of a casing comprising two parts, one of which is movable relative to the other, and a base and a series of frames carried by the movable part of said casing, the said base and frames being shiftable as a whole and swingable relatively to each other when the movable part of said casing has been moved in one direction.

2. In a filing appliance, the combination of a casing comprising two parts, one of which is movable relative to the other, a base and a series of frames carried by and movable with the movable part of said casing, the said base and frames being shiftable as a whole and swingable relatively to each other when the movable part of said casing has been moved in one direction, and mechanism for raising and lowering said movable part of the casing.

3. In a filing appliance, the combination of a casing comprising two parts, one of which is movable relative to the other, a series of leaves mounted on said movable part of the casing and arranged to swing relatively to each other when the movable part has been moved to one of its positions, and extensible telescoping guide means interposed between the two parts of said casing.

4. In a filing appliance, the combination of a casing comprising two parts, one of elevator in raised position and braces it against lateral movement in all directions.

Means are preferably provided for so supporting the leaves that they will be in stepped relationship when arranged in position for operation but will permit them to move longitudinally relatively to each other into a compact stack of rectangular shape, whereby they may be inclosed within the casing. This construction therefore adapts the leaves for a casing of minimum size and convenient shape. Of these means, 9 indicates a base preferably connected by pivot pins or studs $9^a$ to a pair of blocks $9^b$ slidingly mounted in opposite sides of the casing. The operative position of the blocks $9^b$ is at the forward end of the elevator 3 with the base 9 extended, and they may be held in such position by spring catches $9^c$, one carried by each block, and engaging with flanges $3^f$ at the front end of the elevator frame 3. By releasing the catches $9^c$, the blocks $9^b$ may be moved rearwardly for a purpose to be later described.

10, 10, indicate a series of guides arranged at either side of the leaves and extending from front to rear of the elevator 3. Each series of guides is preferably formed by corrugating a sheet metal plate, as shown in Fig. 5; both series of the guides may be formed from a single sheet of metal corrugated at opposite sides and then bent on lines $10^a$, $10^a$, to form a central portion which lies flat on the bottom $3^a$ of the elevator.

As the leaf supporting and operating mechanism is the same on either side of the leaves, only one of such mechanisms need be referred to in the description thereof. 11 indicates a series of bearing blocks one for each leaf 4 (except the front leaf) and each mounted to slide in an adjacent guide 10. Each of said blocks is provided with suitable bearings to receive the pivot pin $4^a$ of the adjacent leaf, whereby the latter is pivotally supported. The pivot pin for the front leaf is mounted in suitable bearings in the adjacent block $9^b$, which during the normal operation of the leaves is stationary.

$4^b$ indicates a series of gears or pinions, one for each pivot pin $4^a$.

12 indicates a series of slide blocks slidingly mounted between the opposing faces of adjoining bearing blocks 11 and arranged between the ribs which form the guides 10 and the near or adjacent side edges of the leaves 4. $12^a$, $12^{a\prime}$, indicate racks formed on the upper and lower surfaces of each slide block 12, and with which the gears or pinions $4^b$ mesh, the gear $4^b$ of one pivot pin meshing with the rack $12^a$ of the block below it and the rack $12^{a\prime}$ of the rack above it. This construction connects all the bearing blocks and slide blocks together, first to cause synchronous movement thereof forwardly or rearwardly and second to cause relative movement between one bearing block and the adjacent slide blocks when the leaf 4 supported by one of said bearing blocks is swung from one position to another. This operation may be clearly illustrated by reference to Fig. 4. Suppose it is desired to raise the uppermost horizontal leaf 4 to a vertical position. The swinging of the leaf from a horizontal position to the vertical position will, by means of the gear $4^b$ meshing with the rack $12^a$ of the block below, move the adjacent bearing block 11 and the leaf 4 supported thereby rearward a distance equal to half the thickness of the leaf. At the same time the slide block 12 above the said bearing block 11 will, by means of the gear $4^b$ meshing with the rack $12^{a\prime}$ thereof, be moved rearward an equal distance plus the movement which was imparted to the bearing block 11, or a distance equal to twice the rearward movement of the said block 11. As the bearing blocks and slide blocks for the leaves 4 above the one operated are rigid relative to each other, all the vertical leaves above the one operated will move rearward with the slide block, (which is immediately above the bearing block of the operated leaf,) as a unit and to the same extent. This operation takes place each time a leaf 4 is operated from a horizontal to a vertical position. When swung from the vertical to the horizontal position the bearing and slide blocks move in an opposite direction to that just described.

16 indicates a device which tends to keep all the leaves 4 in the normal or vertical position. This device preferably comprises a weight $16^a$ arranged to slide up and down at the rear of the elevator 3. A partition $3^{c\prime}$ may be provided spaced from the rear wall $3^c$ to form a chamber for the weight. $16^b$ indicates bands or connections between the weight $16^a$ and the adjacent end leaf 4 and running over guide rollers or pulleys $16^c$ mounted in the upper portion of the elevator 3.

The bands $16^b$ may be connected to the end leaf 4 and weight $16^a$ in any suitable manner. $16^d$ indicates a stop carried by the bearing block for the uppermost leaf. The purpose of this stop is to prevent rearward movement, beyond the vertical position, of the uppermost leaf under the influence of the weight $16^a$. The stop therefore serves as an abutment or back for the uppermost leaf when in operative position and thus supports all the leaves upright when moved into the vertical position.

To arrange the leaves 4 in compact form ready to be lowered in the casing, the spring catches $9^c$ are released from the flanges $3^f$; the leaves are then moved into a horizontal position. Since the forward leaf is released which is movable relative to the other, a base and a series of leaves mounted on said movable part of the casing and arranged to shift as a whole and to swing relatively to each other when the movable part has been moved to one of its positions, and supporting devices for said leaves permitting relative longitudinal movement of said leaves into compact arrangement when said movable part is moved into its other position.

5. In a filing appliance, the combination of a casing, having an opening in its upper end, an elevator movable into and out of said casing and adapted to support a series of leaves or frames swingable from a horizontal position to a vertical position and vice versa, mechanism for raising and lowering said elevator, and extensible telescoping guide means between the elevator and casing.

6. In a filing appliance, the combination of a casing open at its top, an elevator slidingly mounted in the casing and movable through said open top, a base mounted in said elevator and adapted to carry a series of leaves, pivotal supporting devices for the leaves permitting the leaves to be arranged in said elevator in compact relationship, and a base slidable in the elevator and connected to the pivotal supporting devices for one of said leaves and arranged to support the leaves when arranged in compact relationship.

7. In a filing appliance, the combination of a casing open at its top, an elevator slidingly mounted in the casing and movable through said open top and adapted to carry a series of leaves, pivotal supporting devices for the leaves permitting the leaves to be arranged in said elevator in compact relationship, a base slidable in the elevator and connected to the pivotal supporting devices for one of said leaves and arranged to support the leaves when arranged in compact relationship, and means for holding the base in extended position when the leaves are arranged for operation.

8. In a filing appliance, the combination of a casing open at its top, an elevator slidingly mounted in the casing and movable through said open top, and adapted to carry a series of leaves, connections carried by the elevator to which the leaves are pivoted and permitting said leaves to move into compact relation, a base slidably connected to said elevator and movable with one of said leaves, and mechanism for operating said elevator.

9. In a filing appliance, the combination with a casing, of supporting means including an elevator adapted to carry a set of leaves, a base connected with said supporting means and slidable therein, connections between the leaves for supporting them and causing relative movement, devices connected to the leaves and movably mounted on said elevator whereby said leaves are movable into and out of compact relation when they are operated, and telescoping guide means between the elevator and the casing, for guiding the elevator during movement thereof, the said base operating as a support for the leaves when moved into and out of said supporting means.

In testimony whereof I affix my signature, in the presence of two witnesses.

GEORGE JACOBS.

Witnesses:
W. H. SMITH,
M. F. BERBERICH.